(12) United States Patent
Bressani

(10) Patent No.: US 6,662,975 B1
(45) Date of Patent: Dec. 16, 2003

(54) APPARATUS AND A METHOD FOR METERING LIQUIDS

(75) Inventor: Gian Marco Bressani, Hong Kong (CN)

(73) Assignee: Stardale Limited, Wanchai (CN)

( * ) Notice: Subject to any disclaimer, the term of this patent is extended or adjusted under 35 U.S.C. 154(b) by 0 days.

(21) Appl. No.: 10/070,725

(22) PCT Filed: Sep. 10, 1999

(86) PCT No.: PCT/IB99/01537

§ 371 (c)(1),
(2), (4) Date: Mar. 11, 2002

(87) PCT Pub. No.: WO01/20270

PCT Pub. Date: Mar. 22, 2001

(51) Int. Cl.[7] ............................................. B65D 88/54
(52) U.S. Cl. .................... 222/320; 222/386; 222/405
(58) Field of Search ............................ 222/320, 405, 222/386, 537

(56) References Cited

U.S. PATENT DOCUMENTS

| 3,963,151 | A |   | 6/1976 | North, Jr. |   |
|---|---|---|---|---|---|
| 4,491,248 | A |   | 1/1985 | Blackwell |   |
| 4,635,820 | A | * | 1/1987 | Marshall | 222/63 |
| 4,805,810 | A | * | 2/1989 | Czetwertynski | 222/319 |
| 4,890,653 | A |   | 1/1990 | Sartulairi |   |
| 5,785,210 | A | * | 7/1998 | Amberg et al. | 2222/229 |

* cited by examiner

Primary Examiner—Philippe Derakshani
(74) Attorney, Agent, or Firm—Sughrue Mion, PLLC

(57) ABSTRACT

Apparatus for metering one or more liquids contained in respective reservoirs (2, 6) into one or more collecting containers is characterized in that it comprises, for each liquid: a cylinder (2) for the liquid to be metered, the cylinder having a movable piston member (8) in contact with the surface of the liquid in the cylinder (2), pressure means (12) for exerting a constant force on the piston (8), means (14, 16, 18, 20) for the transfer of the liquid from the cylinder (2) to the collecting container, the transfer means comprising a duct having an inlet opening (16) for the withdrawal of the liquid from the cylinder and a delivery opening (20), the transfer means being movable in dependence on the level of liquid in the cylinder (2) and being arranged to keep the geometrical height difference H1 between the withdrawal point and the delivery point proportional to the hydrostatic head of liquid H2 above the withdrawal point with variations in the level of liquid in the cylinder so as to keep the delivery flow-rate constant, and valve means (22) associated with the transfer means for controlling the flow of liquid in the transfer means.

14 Claims, 4 Drawing Sheets

APPARATUS AND A METHOD FOR METERING LIQUIDS

This is a National stage entry under 35 U.S.C. § 371 of Application No. PCT/IB99/01537 filed Sep. 10, 1999; the above noted prior application is hereby incorporated by reference; the international application to which benefit is claimed was published under PCT Article 21(2) in English.

BACKGROUND OF THE INVENTION

The present invention relates to apparatus and to a method for metering liquids and, in particular, to dye-metering apparatus for metering liquid colouring agents for the preparation of varnishes and paints.

The term "liquid" as used in the present description is intended to include viscous and non-viscous liquids, dispersions and fluid suspensions.

In the field of machines for metering dyes for varnishes and paints, manually-operated, semi-automatic or automatic machines with pistons are widely known and are widespread. Machines with pistons comprise, for each colouring agent to be metered, a reservoir communicating with a cylinder having a sliding piston the operation of which brings about the delivery of the required metered quantity. Manually-operated machines are the most widespread owing to their relatively low costs, but they suffer from serious disadvantages in terms of accuracy in volumetric metering. In automatic piston machines, the piston of each cylinder is operated by a respective stepper motor; although automation improves ergonomics and ease of use, it gives rise to a substantial increase in both production and maintenance costs.

Automatic dye-metering machines which use a geared volumetric pump driven by a respective motor and a solenoid valve for the delivery of the liquid for each liquid reservoir and which enable the liquid to be recirculated to the reservoir are also known. The main disadvantage of this type of machine relates to the high costs of both production and maintenance, as well as to limitations in relation to the liquids which can be metered. The geared pump is in fact not suitable for metering dyes containing micaceous substances and cannot therefore be used in the preparation of varnishes for the automotive or "car refinishing" field.

Within the field of automated machines, machines with sequential operation, in which the liquids to be metered are supplied to the collecting container in succession, and machines with simultaneous operation, in which the liquids for the formulation of the desired composition are supplied to the collecting container simultaneously, are available.

In general, in automatic machines, the major portion of the production cost results from the need to transfer the liquids from the supply reservoir to the collecting container at a constant flow-rate which can be controlled by a computer-controlled shut-off system. For this purpose, as has been seen, expensive components such as stepper motors, encoders, graduated pistons, geared pumps and pneumatic pumps are used. To reduce costs, apparatus currently available has a centralized control system for all of the metering circuits installed, but the products to be metered have extremely diverse characteristics and often require dedicated flow-rate and pressure arrangements. In particular, apparatus which is currently available on the market and uses geared pumps has high maintenance and spare-parts costs precisely for the part which controls the flow-rate and the movements of the fluids. This apparatus also requires frequent calibration due to wear of the system or to leakages in the circuit, with consequent loss of accuracy in the small dosages which are extremely important in colour production; moreover, the system used in these machines for achieving a constant flow-rate requires moderate fluctuations of electrical current (which are not always present, particularly in developing countries), requiring the addition of a UPS system with a consequent further increase in costs for the final user in these cases.

SUMMARY OF THE INVENTION

A further known problem in all of the apparatus which is currently available and which generally has product reservoirs exposed to the air, is the drying of the liquids along the wall of the reservoir as the liquid level gradually falls, as well as evaporation of the vehicles of the liquids. As well as causing considerable variations in the rheology of the product and varying its dyeing power (in the case of dyes), with a detrimental effect in colour reproduction, these two factors require constant maintenance of filters or other systems for intercepting hard particles contained in the liquids, which invalidate the precision of the circuit. As stated, a further limitation in systems which use geared pumps is that it is impossible to meter pearly or micaceous products since they are ground up by the pumps, altering the desired final result.

The object of the present invention is to provide apparatus for metering liquids which overcomes the above-mentioned disadvantages and which also has low production and maintenance costs.

For this purpose, the subject of the invention is apparatus for metering one or more liquids contained in respective reservoirs into one or more collecting containers, characterized in that it comprises, for each liquid:
 a cylinder for the liquid to be metered, the cylinder having a movable piston member in contact with the surface of the liquid in said cylinder,
 pressure means for exerting a constant force on the piston,
 means for the transfer of the liquid from the cylinder to the collecting container, the transfer means comprising a duct having an inlet opening for the withdrawal of the liquid from the cylinder and a delivery opening, said transfer means being movable as a function of the level of the liquid in the cylinder and being arranged to keep the geometrical height difference between the liquid-withdrawal point and the delivery point proportional to the hydrostatic head of liquid above the withdrawal point as the level of liquid in the reservoir varies, so as to keep the delivery flow-rate constant, and
 valve means associated with the transfer duct for intercepting and controlling the flow of liquid in the transfer duct.

In a preferred embodiment, the means for the transfer of the liquid from the cylinder to the collecting container comprise an inlet opening communicating with the cylinder for the withdrawal of the liquid and fixed to the piston, and a nozzle for delivery into the collecting container, the nozzle being connected rigidly to the movable piston so that the hydrostatic head of liquid above the inlet opening and the difference in level between the inlet opening and the delivery opening are kept constant as the level of liquid in the cylinder varies.

According to the invention, the cylinder can operate at atmospheric pressure or under pressure. In the atmospheric pressure version, which is usable particularly for nonviscous liquids which do not offer great flow resistance, the piston member may be constituted by a plate which floats on the liquid and which is movable and falls as the level of liquid in the cylinder drops. Typically, in this embodiment, a withdrawal tube is connected rigidly to the floating plate, with the withdrawal opening immersed in the liquid, so that the withdrawal point remains at a constant distance from the level of the liquid, in contact with the atmosphere. In this case, the pressure means referred to in the definition of the invention are constituted by the atmospheric pressure which constitutes an example of the application of a constant force. The flow is started by suction or by the creation of a partial vacuum in the transfer duct.

In the pressurized version, the piston member is slidable sealingly in contact with the walls of the cylinder which is thus sealed and is kept under pressure by means for exerting a constant pressure. Typically, these means comprise a weight which bears on the surface of the piston, or other means which can exert a constant force such as, for example, a mechanical or pneumatic device, for example, a stepper motor, or a source of reduced pressure, ensuring a constant pressure or a suction force. The term "pressure means" is thus intended also to include means which exert a subatmospheric pressure.

Also in the pressurized version, in the preferred embodiment, the transfer means also comprise a withdrawal tube fixed to the piston and immersed in the liquid so that the withdrawal point remains at a constant distance from the liquid level. In this embodiment also, the flow in the transfer duct can be started by a suction effect or may be activated directly by the pressure exerted, or by a combination of the two.

In order to keep the difference in level between the withdrawal point and the point of delivery to the nozzle constant with variations in the liquid level, the transfer means may be constituted by a rigid siphon or may comprise a flexible tube, auxiliary rigid connecting means being provided for connecting the piston to the delivery nozzle; these embodiments will be described in greater detail with reference to the appended drawings.

BRIEF DESCRIPTION OF THE DRAWINGS

Embodiments in which the liquid-inlet and withdrawal opening of the transfer duct is not rigidly connected to the piston but is situated at a predetermined fixed point in the cylinder and is constituted, for example, by a hole in the base or in the side of the cylinder also fall within the scope of the invention; in this case, the hydrostatic head of liquid above the withdrawal point varies with variations in the level of liquid in the cylinder; in this case, in order to achieve a constant delivery rate, means are provided for bringing about a vertical movement of the delivery nozzle so that the geometrical difference in height between the withdrawal point (which in this case is fixed) and the delivery point is kept proportional to the hydrostatic head of liquid above the withdrawal point, as the level of liquid in the reservoir varies. The above-mentioned embodiment involves the use of a control and operating unit arranged for constantly determining the pressure of the column of liquid above the withdrawal point and for bringing about vertical movement of the delivery nozzle in dependence on the variation of the head of liquid above the withdrawal point.

Further advantages and characteristics of the apparatus and of the method according to the invention will become clear from the following detailed description, given with reference to the appended drawings, provided by way of non-limiting example, in which.

DETAILED DESCRIPTION OF THE INVENTION

The apparatus according to the invention may be arranged for simultaneous or sequential metering of liquids; in particular, the apparatus is constituted by a dye-metering machine for metering colouring agents into a varnish or paint base; the apparatus is intended, however, to be usable in all applications which require volumetric metering of liquids, for example, for the metering of food, cosmetic, and pharmaceutical products and chemical products in general.

Figure 1:
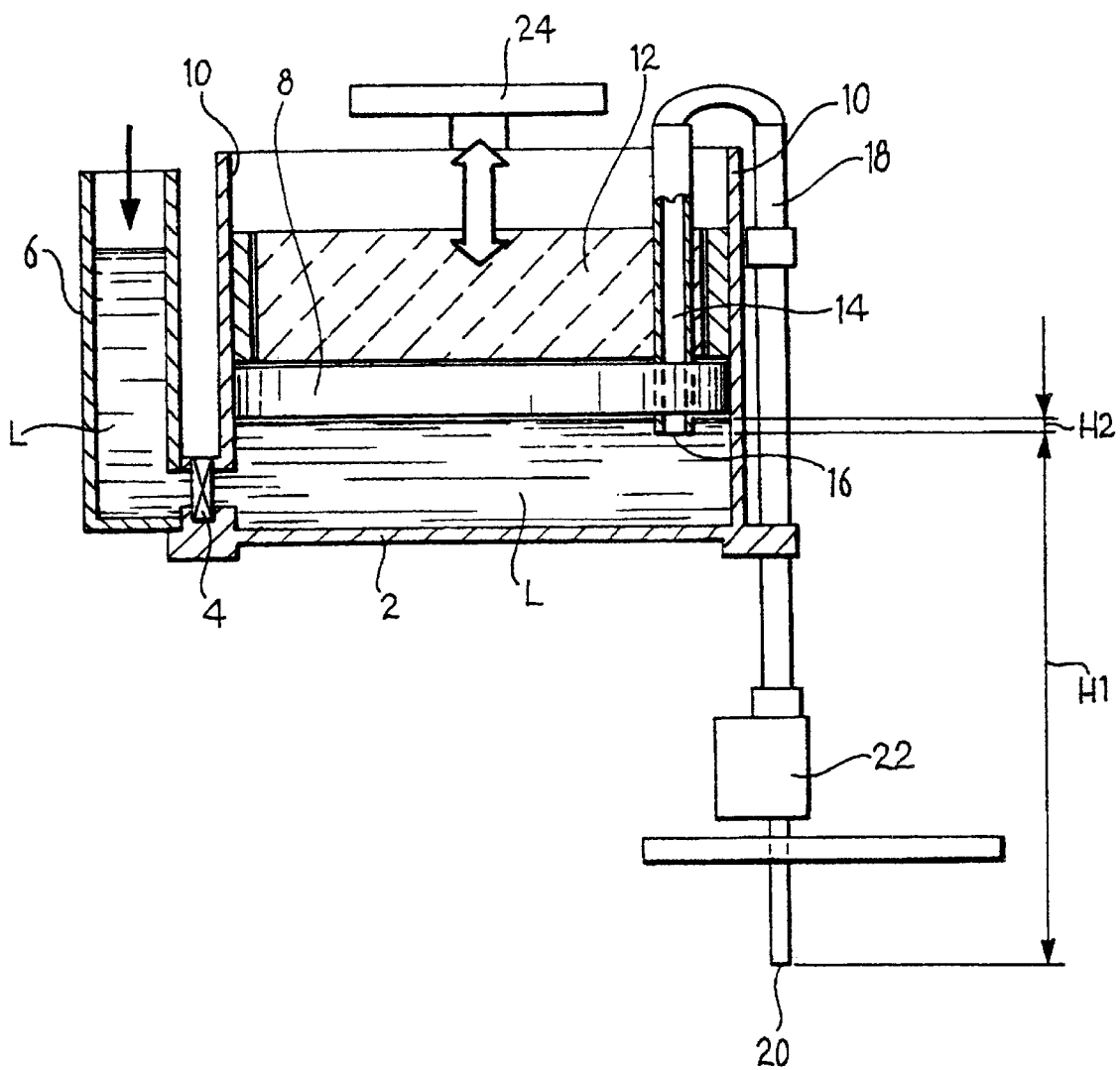
FIGS. 1, 2, 3, and 4 are partially-sectioned, schematic views showing corresponding embodiments of the metering apparatus according to the invention.

With reference to the embodiment of FIG. 1, the apparatus comprises, for each liquid to be metered, a cylinder 2 communicating, by means of a one-way valve 4, for example, of the diaphragm type, with a refilling reservoir 6 containing the liquid L to be metered.

The term "cylinder" as used in the present description is intended to include a container of any shape; it is preferably a circular cylindrical container; any other shape, for example, with a triangular or square base, may be used.

A piston 8 associated with the cylinder 2 is slidable in contact with the walls 10 of the cylinder; the piston 8 is preferably slidable sealingly on the walls 10 of the cylinder with a vertical movement so that the liquid can escape from the cylinder only from the predetermined withdrawal point, as described in greater detail below.

The piston 8 is kept in contact with the upper surface of the liquid by a constant force which may be constituted by its own weight or by a weight 12 which bears on the upper surface of the piston, or by another mechanism which can exert a constant force.

A withdrawal duct 14 is connected rigidly to the piston 8 with its terminal cross-section immersed in the liquid and terminating in a withdrawal opening 16; the hydrostatic head of liquid, indicated $H_2$, above the withdrawal point is thus kept constant with variations in the level of the liquid in the cylinder. A rigid, siphon-like duct 18 which terminates in a nozzle 20 having a delivery opening is connected to the withdrawal duct 14. The geometrical height difference $H_1$ between the withdrawal point 16 and the delivery point 20 is thus also kept constant with variations in the level of liquid in the cylinder.

The nozzle 20 delivers the liquid into a collecting container C (FIG. 4) at atmospheric pressure or, in any case, in an environment which is at a constant pressure.

Means, indicated 22 for intercepting the flow of liquid are associated with the transfer duct and are constituted, for example, by a solenoid valve or by a pneumatic valve, or by any other manually or electronically operated mechanism for choking and controlling the flow of liquid.

In the preferred embodiment, the opening and closure of the valve means 22 are controlled by a control and operating unit, for example, a personal computer, which is arranged to permit setting, by the operator, of the quantity of liquid to be metered, and to bring about opening and closure of the valve means 22 as a function of the metering quantities required and set by the operator.

The cylinder 2 preferably comprises mixing means 52 (FIG. 4), for example, constituted by a magnetic stirrer, for keeping the liquid to be metered homogeneous.

When the apparatus is in operation, the liquid to be metered is first of all loaded into the refilling reservoir 6; this refilling reservoir may, for example, be constituted by a collapsible bag of the type supplied by dye producers and enables the liquid to be metered to be changed easily, according to requirements. Initially, the liquid from the refilling reservoir 6 or collapsible bag is drawn into the cylinder on the basis of the principle of communicating vessels, passing through the one-way diaphragm valve 4. Drive means 24 may also be provided for bringing about vertical upward movement of the piston 8 in order to bring about the flow from the refilling reservoir 6 to the cylinder 2. The liquid introduced into the cylinder 2 is not in contact with the air and is therefore not subject to drying on the walls of the cylinder or to the formation of films and solid residues which could clog the circuit. The frequency of maintenance operations required is thus substantially reduced and this constitutes a clear advantage in comparison with known apparatus. A vent valve or tap is generally present in the uppermost portion of the transfer duct for purging the air from the cylinder during the initial filling of the cylinder with liquid. The air inside the cylinder is removed through the vent or valve whilst the product is drawn in from the refilling reservoir. The diaphragm valve 4 has the function of preventing the liquid from returning to the refilling reservoir as a result of the pressure exerted by the piston once the liquid has been drawn into the cylinder; this valve is closed when the cylinder is under pressure and opens when the piston rises. A certain level of liquid is always maintained in the bottom of the refilling reservoir so as to prevent infiltration of air.

The delivery of the liquid from the cylinder 2 to the collecting container is brought about by the opening of the valve means 22; when the solenoid valve 22 is opened, the fluid emerges from the nozzle 20 into an environment which is at atmospheric pressure or at a constant pressure; when the solenoid valve 22 is closed, the piston member remains stationary and the liquid inside the cylinder cannot return to the refilling reservoir because the valve 4 is closed, since the pressure inside the cylinder is greater than the pressure in the refilling reservoir. In manual versions, it is intended that the valve 4 may also be constituted by a simple open/shut tap.

To control the delivery flow-rate, the desired flow-rate per minute is calculated theoretically, the value of the constant pressure generated by the weight 12 or other equivalent mechanism then being defined experimentally in dependence on the characteristics of the product to be made to flow. The opening and closing times for the valve means 22 are determined by means of calibration software and a thousandths balance which measures the quantities for a predetermined period of time and corrects the opening time in dependence on the quantity delivered. In the metering apparatus according to the invention, in which n independent metering and delivery circuits are provided for metering n liquids, calibration takes place for each individual circuit and a calibration curve is thus obtained. The opening and closure of the valve means is controlled by a PLC or an equivalent processing unit which receives the quantities to be delivered from a computer on which the final operator indicates his preferences. It is important to note that the apparatus according to the invention enables each circuit to be completely independent of the others so that a predetermined formulation of components can be delivered simultaneously, or sequentially if the user so prefers. Naturally, the circuit operates correctly even without a balance, once it has been calibrated.

Since the products to be metered generally have greatly differing viscosities and specifications, the apparatus according to the invention, in which each metering circuit is completely independent, permits calibration both of the desired flow-rate and of the necessary pressure exerted by the pressure means, in order to achieve a uniform and non-turbulent flow. This is achieved whilst avoiding problems of cavitation which tend to cause wear of the components and different flow-rates can be selected for each individual product and circuit.

In the embodiments of FIGS. 2–5, elements identical to those of FIG. 1 are indicated by the same reference numerals. The embodiment of FIG. 2 differs from that of FIG. 1 substantially in that the duct for the transfer of the liquid from the cylinder 2 to the collecting container comprises a flexible tube 26 connected to the withdrawal duct 14 which, as in FIG. 1, is connected rigidly to the piston 8. Whereas in FIG. 1 the valve means 22 are connected to the siphon 18 and therefore move with the entire system, in FIG. 2, the valve means 22 are fixed and are connected to the nozzle 20 by means of the flexible tube 26 and a flexible tube 28. In this embodiment, auxiliary rigid connection means, such as a bracket 30, are provided and connect the piston 8 to the nozzle 20 so that the difference in geometrical height between the withdrawal point 16 and the movable delivery nozzle 20 is also kept constant in this embodiment.

Figure 2:
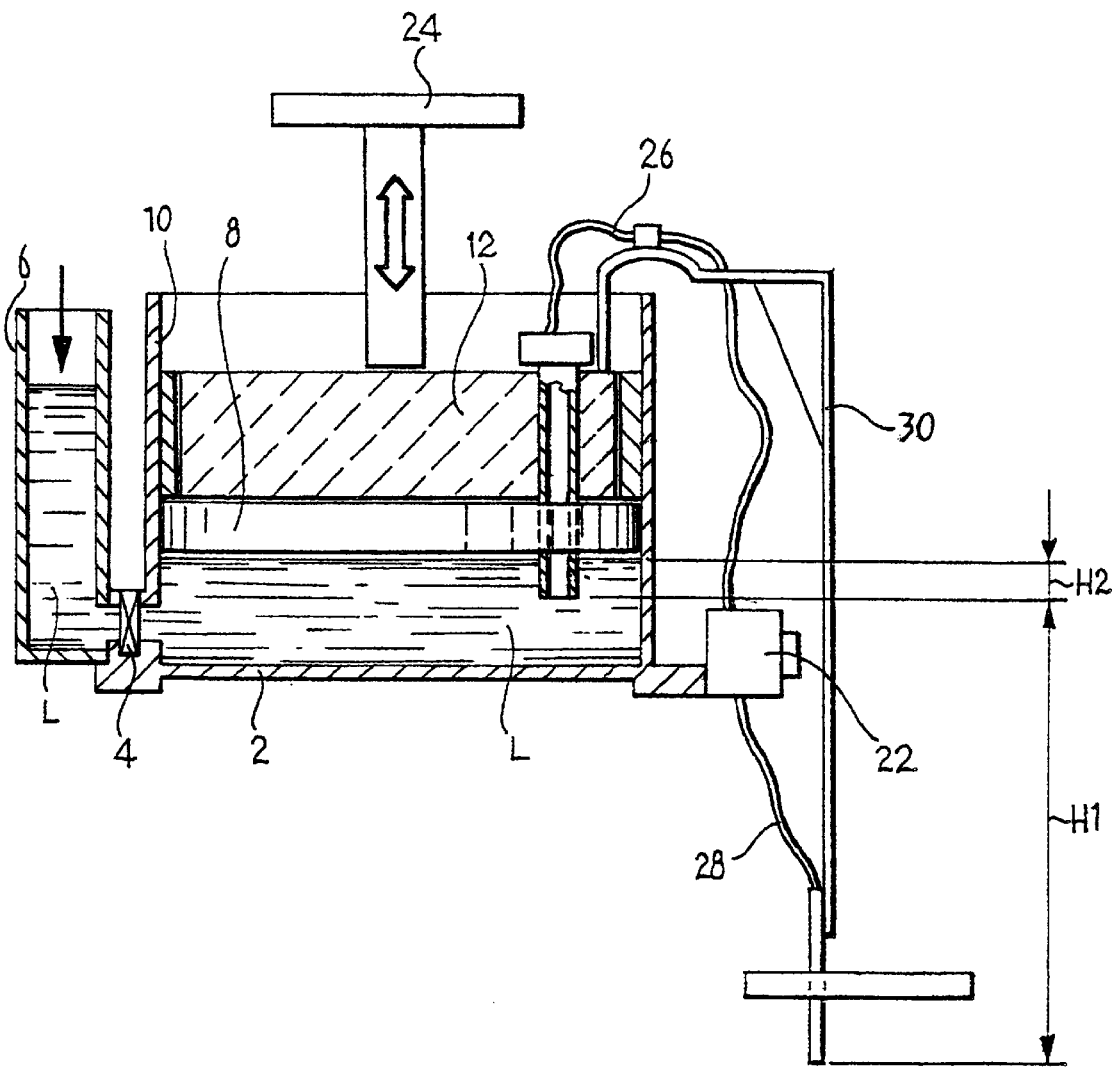
Figure 3:
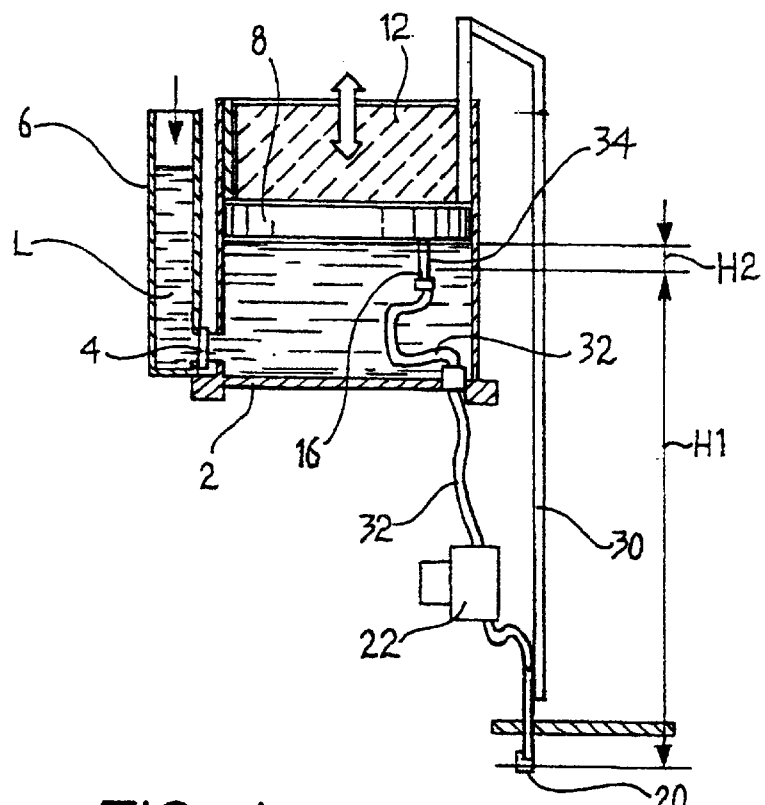

In the embodiment of FIG. 3, the means for the transfer of the liquid from the cylinder 2 to the collecting container comprise a flexible tube 32 immersed in the liquid. The flexible tube 32 is connected rigidly to the piston 8 by means of a rigid connection member 34 immersed in the liquid and has an inlet opening 16 which is at a constant vertical distance from the piston 8. The nozzle 20 is connected rigidly to the piston by rigid connection means 30, as indicated in FIG. 2.

Figure 4:
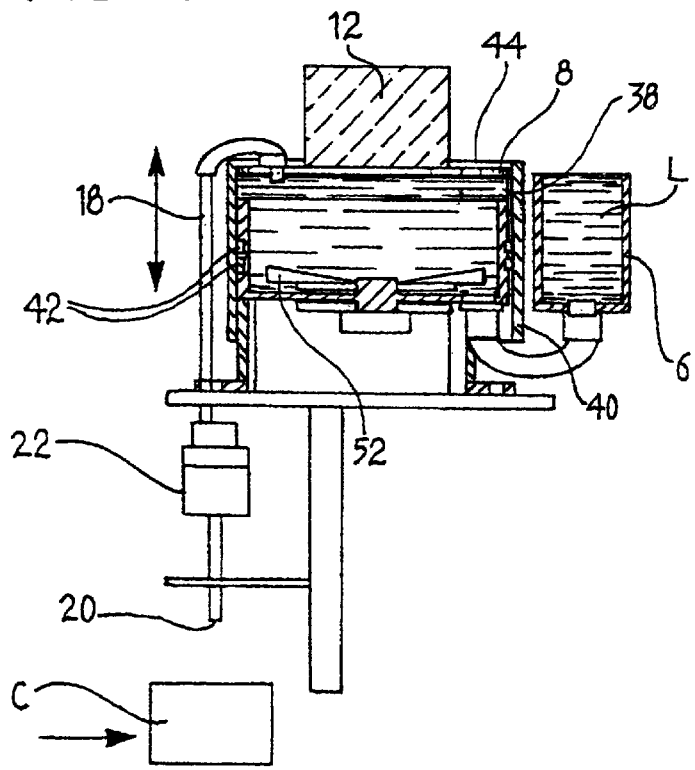

The embodiment of FIG. 4 corresponds substantially to the embodiment of FIG. 1 in which the means for the transfer of the liquid are constituted by a rigid siphon 18. In this embodiment, the piston member is constituted by a slidable cylinder-like cover having side walls 40 which are slidable sealingly, by virtue of sealing means 42, in engagement with the walls 10 of the cylinder, and having an end wall 44 which can exert a pressure on the liquid by virtue of a weight 12.

Figure 5:
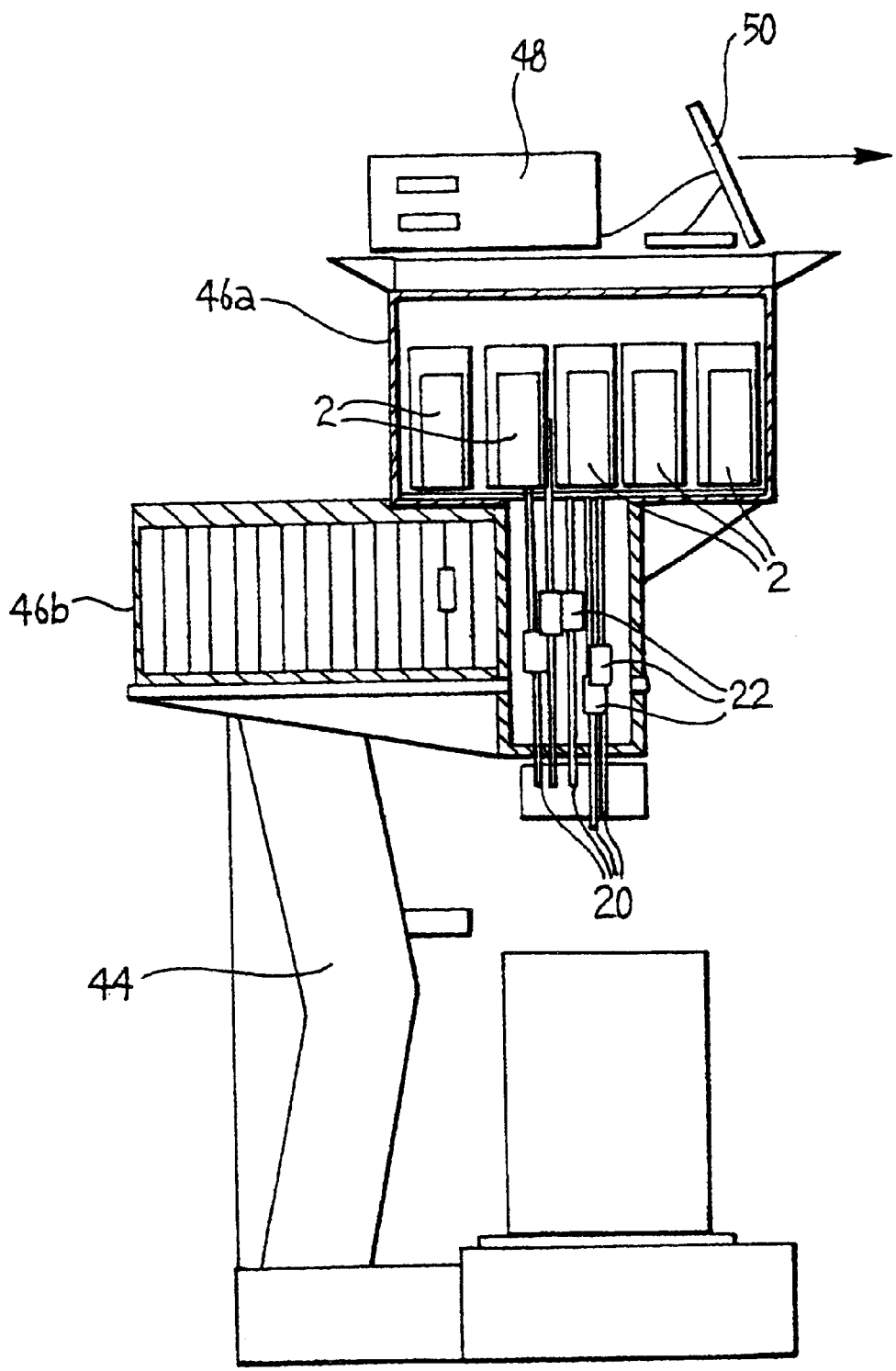
FIG. 5 is a partially-sectioned, schematic view showing metering apparatus, particularly dye-metering apparatus as a whole.

The overall view of FIG. 5 shows a schematic embodiment of dye-metering apparatus or similar metering apparatus comprising a support structure 44 with one or more housings 46a, 46b containing a plurality of delivery circuits each comprising a cylinder 2 to which a refilling reservoir or collapsible bag is connected. Each cylinder is connected to a transfer duct with which valve means 22 are associated and which terminates in a respective nozzle 20. A PLC unit, a personal computer, or another equivalent processing unit is indicated 48 and has a display screen 50; this unit controls the opening and closure of the valve means 22 in accordance with the parameters set by the operator.

As stated, each nozzle can move independently of the others but their movement may clearly be simultaneous or sequential. In the apparatus according to the invention, it is possible to achieve optimal metering performance, even with very small quantities, by variation of the constant pressure exerted on the liquid, at the design stage. A balance of the flow rate with the reaction time of the valve means is thus achieved. The minimum dose can be calculated by calibrating the output rate in dependence on the type of liquid, the pressure losses, and the result to be achieved, and hence the flow-rate per second, in relation to the minimum operation time of the valve or closure system used. A further advantage of the apparatus according to the invention is that even colouring agents or varnishes containing micaceous pigments can be metered precisely by virtue of the absence of mechanisms which can exert a shearing action; the apparatus is thus particularly advantageous in the automotive paint repair (car refinishing) field.

A further subject of the invention is a method of metering a liquid, particularly for metering colouring agents, with the use of a cylinder for the liquid to be metered, the cylinder having a movable piston member in contact with the surface of the liquid, and means for the transfer of the liquid comprising a transfer duct having an inlet opening for the withdrawal of the liquid from the cylinder and a delivery opening, in which the pressure exerted by pressure means for exerting a constant force on the piston brings about a flow of liquid from the inlet opening to the delivery opening, characterized in that, during the delivery of the liquid, the geometrical height difference between the withdrawal point and the delivery point is kept proportional to the hydrostatic head of liquid above the withdrawal point as the level of liquid in the cylinder varies.

As a particular case of the above-mentioned method, the method according to the invention preferably provides for a situation in which the hydrostatic head of liquid above the inlet opening and the difference in level between the inlet opening and the delivery opening are kept constant as the level of liquid in the cylinder varies.

What is claimed is:

1. Apparatus for metering one or more liquids contained in respective reservoirs (2, 6) into one or more collecting containers, characterized in that it comprises, for each liquid:

a cylinder (2) for the liquid to be metered, the cylinder having a movable piston member (8) in contact with the surface of the liquid in the cylinder (2), pressure means (12) for exerting a constant force on the piston (8), means (14, 16, 18, 20) for the transfer of the liquid from the cylinder (2) to the collecting container, the transfer means comprising a duct having an inlet opening (16) for the withdrawal of the liquid from the cylinder and a delivery opening (20), said transfer means being movable in dependence on the level of liquid in the cylinder (2) and being arranged to keep the geometrical height difference $H_1$ between the withdrawal point and the delivery point proportional to the hydrostatic head of liquid $H_2$ above the withdrawal point as the level of liquid in the cylinder varies, so as to keep the delivery flow-rate constant, and valve means (22) associated with the transfer means for controlling the flow of liquid in the transfer means.

2. Apparatus according to claim 1, characterized in that the means for the transfer of the liquid from the cylinder to the collecting container comprise an inlet opening (16) communicating with the cylinder for the withdrawal of the liquid and fixed to the piston (8), and a nozzle (20) for delivery into the collecting container, the nozzle being connected rigidly to the movable piston so that the hydrostatic head of liquid $H_2$ above the inlet opening (16) and the difference in level $H_1$ between the inlet opening (16) and the delivery opening of the nozzle (20) are kept constant as the level of liquid in the cylinder varies.

3. Apparatus according to claim 1, in which the transfer means comprise a rigid, siphon-like duct (18) having a withdrawal arm (14) which terminates in the inlet opening (16), communicating with the cylinder and fixed to the piston member (8).

4. Apparatus according to claim 2, in which the transfer means comprise a flexible duct (26, 28), auxiliary rigid connection means (30) being provided for connecting the movable piston (8) to the delivery opening (20).

5. Apparatus according to claim 1, in which the piston (8) is movable sealingly along the walls (10) of the cylinder with vertical movement and means (12) are provided for exerting a constant force on the piston.

6. Apparatus according to claim 5, characterized in that the means for exerting a constant force comprise a weight (12) or a mechanical device which can exert a constant force.

7. Apparatus according to claim 1, in which the piston (8) comprises a plate floating on the liquid contained in said cylinder (2).

8. Apparatus according to claim 1, in which a refilling reservoir (6) is associated with the cylinder (2) and communicates with the cylinder through one-way valve means (4).

9. Apparatus according to claim 8, characterized in that the refilling reservoir (6) is constituted by a collapsible bag.

10. Apparatus according to claim 1, comprising a control and operating unit (48) arranged to bring about the opening and/or closure of the valve means (22) in dependence on parameters for the metering of the liquid to be metered, the parameters being set by an operator.

11. Apparatus according to claim 1, constituted by a dye-metering machine for metering colouring agents.

12. A method of metering liquids, particularly for metering colouring agents, with the use of a cylinder (2) for each liquid to be metered, the cylinder having a movable piston member (8) in contact with the surface of the liquid in the cylinder and means (14, 16, 18, 20) for the transfer of the liquid from the cylinder to a collecting container, the transfer means having an inlet opening (16) for the withdrawal of the liquid from the cylinder and a delivery opening (20), in which a pressure exerted on the piston (8) by means for exerting a constant force brings about a flow of the liquid from the inlet opening to the delivery opening, characterized in that, during the delivery of the liquid, the geometrical height difference $H_1$ between the withdrawal point and the delivery point is kept proportional to the hydrostatic head of liquid $H_2$ above the withdrawal point as the level of liquid in the cylinder (2) varies.

13. A method according to claim 12, in which the difference in level $H_1$ between the inlet opening and the delivery opening and the hydrostatic head of liquid $H_2$ above the inlet opening are kept constant as the level of liquid in the cylinder varies.

14. A method according to claim 11, in which the liquid to be metered is supplied to the cylinder (2) by means of a refilling reservoir (6) connected to the cylinder by means of a one-way valve.

* * * * *